United States Patent [19]

Haga et al.

[11] 4,413,025
[45] Nov. 1, 1983

[54] COATING COMPOSITION FOR POLYCARBONATE MOLDINGS CONTAINING PARTIALLY HYDROLYZED ALKYLTRIALKOXYSILANE AND POLYVINYLBUTYRAL

[75] Inventors: Mitsunobu Haga; Yasuzi Omori, both of Himeji, Japan

[73] Assignee: Daicel Chemical Industries, Ltd., Sakai, Japan

[21] Appl. No.: 313,130

[22] Filed: Oct. 20, 1981

[30] Foreign Application Priority Data

Nov. 12, 1980 [JP] Japan ................... 55-159317

[51] Int. Cl.³ .................... C08L 83/06; B05D 3/02
[52] U.S. Cl. ................... 427/387; 427/393.5; 428/412; 524/300; 525/58; 525/61
[58] Field of Search ............ 525/61, 58; 427/387, 427/393.5; 428/412; 524/300

[56] References Cited

U.S. PATENT DOCUMENTS

| | | | |
|---|---|---|---|
| 2,506,320 | 5/1950 | Vail | 525/61 |
| 3,000,842 | 9/1961 | Homier et al. | 525/61 |
| 3,240,741 | 3/1966 | Campbell | 525/61 |
| 3,252,825 | 5/1966 | Marzocchi et al. | 525/61 |
| 3,392,130 | 7/1968 | Rucker et al. | 525/61 |
| 4,338,375 | 7/1982 | Hashimoto et al. | 427/387 |

*Primary Examiner*—Wilbert J. Briggs, Sr.
*Attorney, Agent, or Firm*—Flynn, Thiel, Boutell & Tanis

[57] ABSTRACT

A coating composition for polycarbonate moldings comprises (A) 100 parts by weight of a partially hydrolyzed condensate of an alkyltrialkoxysilane of the general formula:

$$R^1Si(OR^2)_3$$

wherein $R^1$ represents an alkyl group of 1-4 carbon atoms and $R^2$ represents an alkyl group of 1-4 carbon atoms, and (B) 0.5-6 parts by weight of polyvinylbutyral resin.

10 Claims, No Drawings

COATING COMPOSITION FOR POLYCARBONATE MOLDINGS CONTAINING PARTIALLY HYDROLYZED ALKYLTRIALKOXYSILANE AND POLYVINYLBUTYRAL

The present invention relates to a coating composition for polycarbonate moldings capable of forming a coating film having excellent mar resistance, flexibility, transparency, adhesion and durability.

Generally, plastics are used broadly for various purposes in virtue of their excellent properties such as moldability, lightness in weight and impact resistance. However, they have the defects that, as compared with other materials, they have lower surface hardness, mar resistance and solvent resistance and, therefore, their commercial values are easily deteriorated.

For solving those problems, there have been proposed processes for coating the surfaces of plastic articles with a mar-resistant coating material. Various processes for the coating have been proposed. A typical example of those processes comprises applying a partially hydrolyzed condensate of an alkyltrialkoxysilane to plastic moldings and curing the same (Japanese Patent Laid-Open No. 143822/1975). However, in case the plastic is a polycarbonate resin such as poly-2,2-di-(p-hydroxyphenyl)propane carbonate, a sufficient adhesion of the coating film thereto cannot be obtained. Said coating film has particularly low adhesion retention and it is peeled off in a short time in accelerated weathering tests.

An object of the present invention is to provide a mar-resistant coating having a good adhesion to polycarbonate resins which coating can be applied thereto without necessitating any pretreatment.

Another object of the present invention is to provide a flexible coating material which can be processed without causing cracks on the coating film surface in case it is applied to spectacle lenses and they are set in the frames.

Still another object of the present invention is to provide a coating material having a high transparency and suitable for use as a substitute for safety glass or window glass for which a high transparency is required.

The present invention provides a coating composition for polycarbonate moldings which comprises:

(1) 100 parts by weight of a partially hydrolyzed condensate of an alkyltrialkoxysilane of the general formula:

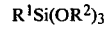

$$R^1Si(OR^2)_3$$

wherein $R^1$ represents an alkyl group of 1-4 carbon atoms and $R^2$ represents an alkyl group of 1-4 carbon atoms, and (2) 0.5–6 parts by weight of polyvinylbutyral resin.

The coating composition of the present invention can be dissolved in a solvent and, if desired, a curing catalyst may be added thereto.

The coating composition of the present invention may be prepared by mixing a previously, partially hydrolyzed condensate of alkyltrialkoxysilane of above general formula $R^1Si(OR^2)_3$ with polyvinylbutyral resin in a given ratio. Alternatively, the above composition may be obtained by mixing alkyltrialkoxysilane of above general formula: $R^1Si(OR^2)_3$ with polyvinylbutyral resin and then hydrolyzing the same in a solvent.

Thus obtained coating liquid is applied to the surface of polycarbonate moldings and the coating film is dried and cured to obtain a surface coating having excellent mar resistance and adhesion.

As alkyltrialkoxysilanes (A) of the general formula: $R^1Si(OR^2)_3$, there may be mentioned methyltrimethoxysilane, methyltriethoxysilane, ethyltrimethoxysilane and ethyltriethoxysilane. Those compounds may be used either alone or in the form of a mixture of two or more of them. As the partially hydrolyzed condensates of alkyltrialkoxysilanes, there may be mentioned, for example, a hydrolyzed condensate obtained by heating an alkyltrialkoxysilane together with water and a very small amount of an acid at a temperature of 50°–80° C. for 1–10 hours as described in the specification of U.S. Pat. No. 3,389,114.

A partially hydrolyzed copolycondensate of said alkyltrialkoxysilane (A) with a tetraalkoxysilane or a mixture of alkyltrialkoxysilane (A) with a tetraalkoxysilane is used in some cases for the purpose of further improving properties such as hardness of the resulting coating film. However, the use of the copolycondensate or mixture with the tetraalkoxysilane is undesirable in the present invention, since adhesion and other physical properties are degraded thereby.

Polyvinylbutyral resin (B) is a polymer having hydroxyl group, acetyloxy group and butyral group obtained by reacting polyvinyl alcohol (obtained by the saponification of polyvinyl acetate) with butyl aldehyde. Component (B) has preferably a polymerization degree of about 200–2000 and butyral introduction degree of about 55–65%.

Component (B) has functions of improving coating properties of the solution of the composition, imparting a long durable, stable, high adhesion to the cured coating film of the composition applied to polycarbonate resin moldings and also imparting a flexibility to the cured coating film to improve storage stability.

If the amount of component (B) used for said purpose is less than 0.5 part by weight, the adhesion and durability such as weatherability of the coating film are insufficient and if it is more than 6 parts by weight, the transparency and mar resistance are reduced unfavorably.

For forming a protective film from the coating composition comprising components (A) and (B), it is reacted and cured by heating in the presence of a curing catalyst. As the curing catalysts, there may be used trialkyl($C_1$–$C_3$)amines such as trimethylamine and triethylamine, quaternary ammonium hydroxides such as tetramethyl ammonium hydroxide, tetraethyl ammonium hydroxide, trimethyl benzyl ammonium hydroxide and triethyl benzyl ammonium hydroxide, straight chain amidines such as guanidine and cyclic amidines such as 1,8-diazabicyclo(5,4,0)undecene-7 and 1,6-diazabicyclo(4,3,0)nonene-5. Further, weak salts of them may also be used. As the weak acids, there may be used those having a pKa of at least 3. They include, for example, carboxylic acids having 1–8 carbon atoms such as formic acid, acetic acid, propionic acid, butyric acid, valeric acid, caproic acid, enanthic acid, caprylic acid and chloroacetic acid, polybasic acids such as fumaric acid, maleic acid and tartaric acid, aromatic carboxylic acids such as benzoic acid and phthalic acid, phenol and thioacetic acid.

The amount of the curing catalyst varies depending on curing temperature and curing time. Generally, it is preferred to use the curing catalyst in an amount of 0.1–15 parts by weight per 100 parts by weight of partially hydrolyzed condensate of alkyltrialkoxysilane (A).

The solvent is used as occasion demands in the application of the mixture of above components (A) and (B) and, if necessary, the curing catalyst to the surface of polycarbonate moldings for the purpose of homogeneously mixing these components to obtain a solution, improving the wettability of the base material by the solution and accelerating the uniform, curing reaction to promote the formation of the cured coating film having uniform physical properties. As the preferred solvents, there may be mentioned lower alcohols of 1–5 carbon atoms such as ethyl alcohol, isopropyl alcohol and butyl alcohol, carboxylic acids of 1–5 carbon atoms such as acetic acid, propionic acid and butyric acid, esters such as ethyl acetate, butyl acetate and amyl acetate, ketones such as methyl ethyl ketone and methyl isobutyl ketone, cellosolves such as ethylcellosolve, butylcellosolve and cellosolve acetate, aromatic hydrocarbons such as toluene and xylene, and chlorinated hydrocarbons such as trichloroethylene, chloroform and carbon tetrachloride. In case the solvent is used in the present invention, the solvent is selected suitably for attaining said purposes. A solvent mixture containing at least one alcohol such as ethyl alcohol, isopropyl alcohol or butyl alcohol, acetic acid and water as indispensable components is preferred. A coating solution comprising the mixed solvent, hydrolyzed condensate of alkyltrialkoxysilane (A), polyvinylbutyral resin (B) and the curing catalyst, if necessary, is stable at ambient temperature for a long period of time and the coating solution can be stored as it is. If the coating solution is applied to a substrate and heated, it is cured at a proper velocity to form a coating film. The solvent mixture comprises most preferably 30–70 parts by weight of an alcohol, 1–20 parts by weight of acetic acid, 0.5–20 parts by weight of water and 0–30 parts by weight of other solvent(s). The amount of the solvent mixture is such that solid content of the composition will be 10–40%.

The composition may further be incorporated with a silicone-containing surfactant such as a block or graft copolymer of dimethylsiloxane with an alkylene oxide, fluorine-containing surfactant, U.V. absorber, heat stabilizer and dyestuff for the purposes of improving the smoothness of the coating film and reducing friction factor of the coating film surface.

The coating methods may be selected suitably according to the shape of the substrate used. For example, there may be employed immersion coating, spin coating, roll coating and curtain flow coating.

The coating composition is cured by heating. The heating temperature is such that the polycarbonate substrate is not softened. Preferably, the temperature is in the range of about 80° to 135° C.

Various polycarbonate moldings may be coated with the composition of the present invention. For effectively utilizing the characteristic properties, i.e. high transparency, mar resistance and flexibility, of the coating film obtained from the coating composition of the present invention, preferred polycarbonate moldings include, for example, plastic lenses such as sunglass lenses and ophthalmic lenses, particularly safety eyeglass lenses prepared taking advantage of impact resistance of polycarbonate, goggles, sun visor, watch cover, plastic showcase, nameplate, lighting fixtures, mirror and safety glass.

As described above, the present invention provides a coating composition for polycarbonate moldings which composition comprises components (A) and (B). The present invention includes also the following embodiments:

(1) Composition comprising components (A) and (B) and curing catalyst,
(2) Liquid composition comprising components (A) and (B), curing catalyst and solvent,
(3) Polycarbonate moldings having on its surface a cured coating film mainly comprising components (A) and (B),
(4) Lenses of glasses comprising polycarbonate having a coating film of (3), and
(5) Transparent polycarbonate plate having a coating film of (3).

The following examples illustrate processes for the production of the composition of the present invention and effects thereof.

EXAMPLE 1

356 g of methyltriethoxysilane, 108 g of water and 1 c.c. of 0.1 N hydrochloric acid were mixed thoroughly and the mixture was heated under reflux for four hours. Then, ethanol and excessive water were evaporated out to obtain a partially hydrolyzed condensate of methyltriethoxysilane.

100 Parts (by weight; the same shall apply hereinafter) of the partially hydrolyzed condensate of methyltriethoxysilane were dissolved in 200 parts of 10% hydrous n-butanol containing 1 part of Tinuvin 327 (ultraviolet absorber of Ciba-Geigy Co.) and 3 parts of S-Lec B, BMS (polyvinylbutyral resin having a polymerization degree of about 750; a product of Sekisui Kagaku Co., Ltd.) to obtain solution (A).

Then, 20 parts of n-butanol were mixed with 68 parts of acetic acid. The resulting mixture was added with 10 parts of 10 wt. % aqueous solution of tetraethyl ammonium hydroxide (curing catalyst) and then with 1 part of an anionic surfactant having a fluorocarbon chain to obtain solution (B).

Solutions (A) and (B) were stirred together to obtain a coating solution.

The coating solution was then applied to transparent polycarbonate resin sheets having a size of 100×100×3 mm and polycarbonate resin lenses (83φ, 2 mm thickness) by curtain coating method. Immediately thereafter, they were heated to 130° C. for one hour in a hot air dryer. The coated sheets and lenses were subjected to the following tests to obtain the results shown in Table 1.

(1) Measurement of mar resistance:

The coating sheets were abraded by means of a Taber machine (a product of Yasuda Seiki Co.) under conditions comprising truck wheel CS-10F, 500 g load and 20 cycles. Mar resistance was represented by haze (%) determined by means of a haze meter.

$$\text{Haze (\%)} = \frac{\text{Scattered light}}{\text{Whole light transmittance}} \times 100$$

(2) Initial adhesion:

The coated sheets were incised by means of a razor blade to obtain 11 longitudinal and transverse incisions at intervals of 1 mm, thereby obtaining a crosshatch. Those incisions had a depth which reached the base. A cellophane adhesive tape was applied firmly to the corsshatch. The tape was strongly jerked in a direction perpendicular to the sheet. Degree of peeling of the coating film was examined. Number of the squares peeled off was counted.

(3) Weatherability tests:

The coated sheets were subjected to weatherability test by means of a sunshine type weatherometer in the same manner as above initial adhesion test. The weatherability was shown by irradiation time determined with the weatherometer at which the adhesion began to lower.

(4) Flexibility:

Coated lenses were bent at a rate of 3 mm/min. The flexibility was shown by deflection amount (mm) of the lenses determined when creases were formed in the lenses.

EXAMPLE 2

The same procedure as in Example 1 was repeated except that S-Lec B, BMS was replaced with 2 parts of S-Lec B, BXL (polyvinylbutyral resin having a polymerization degree of about 300; a product of Sekisui Kagaku Co., Ltd.) and that tetraethyl ammonium hydroxide used as a curing catalyst was replaced with 1.3 parts of phenol salt of 1,8-diazobicyclo(5,4,0)-undecene-7. The results are shown in Table 1.

EXAMPLE 3

The same procedure as in Example 1 was repeated except that S-Lec B, BMS was replaced with 1 part of Esrex B, BL-3 (polyvinylbutyral resin having a polymerization degree of about 270; a product of Sekisui Kagaku Co., Ltd.). The results are shown in Table 1.

EXAMPLE 4

The same procedure as in Example 1 was repeated except that 4 parts of S-Lec B, BMS were used in place of 3 parts thereof and that 10% hydrous n-butanol was replaced with 10% hydrous isoamyl alcohol. The results are shown in Table 1.

EXAMPLE 5

The same procedure as in Example 1 was repeated except that 1.5 parts of Esrex B, BXL were used in place of S-Lec B, BMS and the curing was effected by heating at 110° C. for one hour. The results are shown in Table 1.

COMPARATIVE EXAMPLE 1

Uncoated polycarbonated resin sheets were tested in the same manner as in Example 1 to obtain the results shown in Table 1.

COMPARATIVE EXAMPLE 2

The same procedure as in Example 1 was repeated except that S-Lec B, BMS (polyvinylbutyral resin having a polymerization degree of about 750; a product of Sekisui Kagaku Co., Ltd.) was not used. The results are shown in Table 1.

COMPARATIVE EXAMPLE 3

186 Parts of methyltriethoxysilane, 32 parts of ethyl silicate and 338 parts of isopropyl alcohol were mixed together. 70 Parts of 0.02 N NCl were added to the mixture and the whole was stirred at 30° C. for 60 minutes and then aged at room temperature for two days. In the resulting solution, 10 parts of S-Lec B, BL-3 (polyvinylbutyral resin; a product of Sekisui Kagaku Co., Ltd.) were dissolved. The solution was added with 30 parts of acetic acid, then with 10 parts of 10 wt. % aqueous tetraethyl ammonium hydroxide solution and finally with 3 parts of an anionic surfactant having a fluorine carbide chain to obtain a coating solution.

The coating solution was applied to a polycarbonate resin sheet and cured by heating in the same manner as in Example 1. The results are shown in Table 1.

COMPARATIVE EXAMPLE 4

The same procedure as in Example 1 was repeated except that S-Lec B, BMS was used in an amount of 10 parts.

Thus obtained polycarbonate resin sheets and lenses had milky surfaces and they were unsuitable for use.

TABLE 1

|  | Initial adhesion | Mar resistance | Weather ability | Flexibility |
|---|---|---|---|---|
| Example 1 | 100 | 0.9% | 800 hr | 20 mm |
| 2 | 100 | 1.0 | 800 | 18 |
| 3 | 100 | 0.8 | 800 | 15 |
| 4 | 100 | 1.5 | 800 | 23 |
| 5 | 100 | 1.0 | 800 | 17 |
| Comparative Example 1 | — | 40 | — | — |
| 2 | 0 | 1.0 | — | 5 |
| 3 | 100 | 4.0 | 100 | 10 |

The embodiments of the invention in which an exclusive property or privilege is claimed are defined as follows:

1. A coating composition which is curable to provide a tenacious, transparent, mar-resistant, flexible coating on a polycarbonate molding, which comprises a mixture of (A) 100 parts by weight of an organic-solvent-soluble, partially hydrolyzed condensate of an alkyltrialkoxysilane having the formula $$R^1Si(OR^2)_3$$

wherein $R^1$ is alkyl having 1 to 4 carbon atoms and $R^2$ is alkyl having 1 to 4 carbon atoms, said condensate being free of tetraalkoxysilanes and copolycondensates of tetraalkoxysilanes, and (B) 0.5 to 6 parts by weight of polyvinylbutyral resin.

2. A coating composition as claimed in claim 1, in which said composition is prepared by mixing the alkyltrialkoxysilane and polyvinylbutyral resin and then partially hydrolyzing the mixture in the presence of water.

3. A coating composition as clamed in claim 1, in which said alkyltrialkoxysilane is selected from the group consisting of methyltrimethoxysilane, methyltriethoxysilane, ethyltrimethoxysilane and ethyltriethoxysilane.

4. A polycarbonate article coated with the coating composition claimed in claim 1 and cured.

5. A coating composition as claimed in claim 1, in which said condensate is the product of the partial hydrolysis and condensation of said alkyltrialkoxysilane, in the presence of water and an acid.

6. A coating solution consisting essentially of a coating composition as claimed in claim 1 dissolved in an inert organic solvent.

7. A coating solution as claimed in claim 6, further containing an effective amount of a catalyst for curing said condensate.

8. A coating solution as claimed in claim 6, in which said solvent is a mixture of 30 to 70 parts by weight of an alkanol having from 1 to 5 carbon atoms, from 1 to 20 parts by weight of acetic acid, from 0.5 to 20 parts of water and 0 to 30 parts by weight of another solvent, said coating solution containing from 10 to 40 percent by weight of said mixture of said condensate and said polyvinylbutyral resin.

9. A coating process which comprises applying to a polycarbonate substrate a thin coating film of a coating solution as claimed in claim 6 and then heating the coated polycarbonate substrate, at a temperature in the range of about 80° to 135° C., to form a hardened dry coating film on said polycarbonate substrate.

10. A coated polycarbonate molding prepared by the process of claim 1.

* * * * *

UNITED STATES PATENT AND TRADEMARK OFFICE
CERTIFICATE OF CORRECTION

PATENT NO. : 4 413 025

DATED : November 1, 1983

INVENTOR(S) : Mitsunobu HAGA et al

It is certified that error appears in the above-identified patent and that said Letters Patent is hereby corrected as shown below:

Column 8, line 8; change "claim 1" to ---claim 9---.

Signed and Sealed this

Sixth Day of March 1984

[SEAL]

Attest:

GERALD J. MOSSINGHOFF

*Attesting Officer*  *Commissioner of Patents and Trademarks*